United States Patent
Palermiti et al.

(10) Patent No.: US 8,639,661 B2
(45) Date of Patent: Jan. 28, 2014

(54) SUPPORTING MEDIA CONTENT REVERT FUNCTIONALITY ACROSS MULTIPLE DEVICES

(75) Inventors: Michael F. Palermiti, Issaquah, WA (US); Scott R. Ramsby, Kirkland, WA (US); Francisco J. Garcia-Ascanio, Redmond, WA (US); Dejan D. Subotic, Kirkland, WA (US); Brian D. Remick, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 12/325,392

(22) Filed: Dec. 1, 2008

(65) Prior Publication Data

US 2010/0138385 A1   Jun. 3, 2010

(51) Int. Cl.
  *G06F 17/30* (2006.01)
(52) U.S. Cl.
  USPC .......................... 707/626; 707/638
(58) Field of Classification Search
  None
  See application file for complete search history.

(56) References Cited

U.S. PATENT DOCUMENTS

| | | | |
|---|---|---|---|
| 6,671,757 B1 | 12/2003 | Multer et al. | |
| 6,904,185 B1 | 6/2005 | Wilkins et al. | |
| 7,216,289 B2 | 5/2007 | Kagle et al. | |
| 7,769,717 B2 * | 8/2010 | Federwisch et al. | 707/649 |
| 7,769,723 B2 * | 8/2010 | Zheng et al. | 707/682 |
| 2002/0169893 A1 | 11/2002 | Chen et al. | |
| 2002/0188667 A1 | 12/2002 | Kirnos | |
| 2003/0154238 A1 * | 8/2003 | Murphy et al. | 709/201 |
| 2004/0068505 A1 * | 4/2004 | Lee et al. | 707/100 |
| 2004/0264810 A1 | 12/2004 | Taugher et al. | |
| 2005/0091270 A1 | 4/2005 | Beilinson et al. | |
| 2006/0101064 A1 | 5/2006 | Strong et al. | |
| 2006/0271603 A1 | 11/2006 | Mathias | |
| 2007/0299888 A1 | 12/2007 | Thornton et al. | |
| 2009/0055464 A1 * | 2/2009 | Multer et al. | 709/201 |
| 2009/0113076 A1 * | 4/2009 | Long | 709/248 |
| 2009/0198805 A1 * | 8/2009 | Ben-Shaul et al. | 709/222 |

FOREIGN PATENT DOCUMENTS

WO   WO-2008103529   8/2008

OTHER PUBLICATIONS

"International Search Report", Jun. 24, 2010, Application No. PCT/US2009/064059, Filed Date Nov. 11, 2009, pp. 11.
"Photoshop Lightroom—Who Needs It?", Retrieved at <<http://web.mac.com/essentialskills/iWeb/Photoshop_Essential-Skills_Blog/Photoshop_Blog/356D112A-B55B-495E-9AA4-78AD3096CBD7.html>>, Sep. 25, 2008, pp. 14.
"Graphics Tools", Retrieved at <<http://mobilevodoo.com/blogcategory/graphics-tools/>>, Sep. 25, 2008, pp. 7.

(Continued)

Primary Examiner — Neveen Abel Jalil
Assistant Examiner — Kevin L Young
(74) Attorney, Agent, or Firm — Wolfe-SBMC (57) ABSTRACT

Both an edited version of a first image and an original version of the first image are stored at a first computing device. In response to a user request to synchronize images across multiple computing devices, both the edited version of the first image and the original version of the first image are synchronized with a second computing device. A user is allowed to revert to the original version of the first image regardless of on which of the multiple computing devices the edited version was changed.

16 Claims, 5 Drawing Sheets

(56) References Cited

OTHER PUBLICATIONS

"PicaJet Com Releases PicaJet Photo Manager 2 5 0 488", Retrieved at <<http://www.softarea51.com/press-release/PicaJet_Com_Releases_PicaJet_Photo_Manager_2_5_0_488.html>>, Sep. 25, 2008, pp. 6.

Diefendorff, Keith, "Slow "Synchronize Folder . . . " in LR2", Retrieved at <<http://www.adobeforums.com/webx?14@@.59b630a1/1>>, Aug. 17, 2008, pp. 9.

"Once You Sync, You'll Never Go Back", Retrieved at <<http://www.sharpcastphotos.com/products/photos/sync.html>>, Sep. 25, 2008, pp. 2.

"IKnown Folder Manager Interface", Retrieved Nov. 12, 2008 from <http://msdn.microsoft.com/en-us/library/bb761744(VS.85,printer).asp>,pp. 1-2.

"Known Folder ID", Retrieved Nov. 28, 2009 from <http://msdn.microsoft.com/en-us/library/bb762584(VS.85,printer).aspx>,pp. 1-19.

Extended European Search Report, European Patent Application No. 09830822.4, (May 22, 2012), 6 pages.

Foreign Office Action, Chinese Application No. 200980149098.4, (May 16, 2013), 6 pages.

Foreign Office Action, Chinese Application No. 200980149098.4, (Dec. 4, 2012), 11 pages.

\* cited by examiner

SUPPORTING MEDIA CONTENT REVERT FUNCTIONALITY ACROSS MULTIPLE DEVICES

BACKGROUND

As computing and digital imaging technology has advanced, computers have become an increasingly popular platform for managing, viewing, and sharing photographs, video, and other media content. Despite this popularity, problems with current systems remain. These problems include, for example, cumbersome processes for storing backup copies of images being edited, and cumbersome processes for users accessing their images from multiple computers. These problems detract from the usability of such systems, and degrade the user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, both an edited version of a first image and an original version of the first image are stored at a first computing device. In response to a user request to synchronize images across multiple computing devices, both the edited version of the first image and the original version of the first image are synchronized with a second computing device. A user is allowed to revert to the original version of the first image regardless of on which of the multiple computing devices the edited version was changed.

In accordance with one or more aspects, a first folder of a first computing device is identified. The first folder stores an original version of first media content having an edited version that is stored in a second folder of the first computing device. The first media content is one of multiple media content on the first computing device. An indication that the multiple media content on the first computing device are to be synchronized with a second computing device is received. In response to receiving the indication, a synchronization module of the first computing device is notified that the first folder is to be synchronized with a third folder of the second computing device.

BRIEF DESCRIPTION OF THE DRAWINGS

The same numbers are used throughout the drawings to reference like features.

DETAILED DESCRIPTION

Supporting media content revert functionality across multiple devices is discussed herein. Images, video, and/or other media content stored on a device can be edited by a user of the device. This content can also be synchronized with other devices, allowing the content to be edited and/or viewed by the user on multiple different devices. Additionally, a revert functionality allows the user to revert back to an original version of the image after edits have been made. This revert functionality is supported across the multiple different devices, allowing the user to revert back to the original version from any of the multiple devices regardless of the device on which the edits were made.

Figure 1:
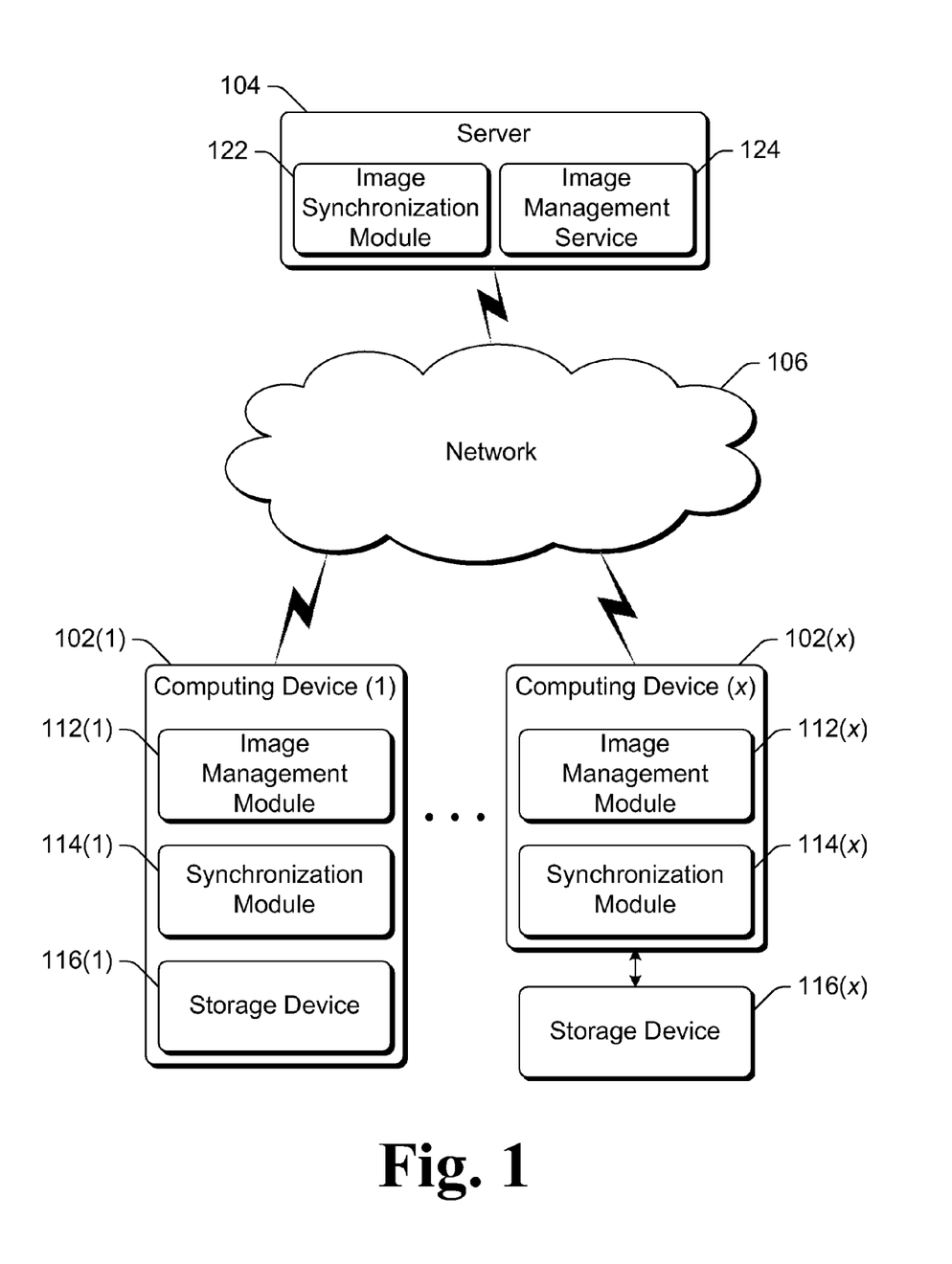
FIG. 1 illustrates an example system implementing the supporting media content revert functionality across multiple devices in accordance with one or more embodiments.

FIG. 1 illustrates an example system 100 implementing the supporting media content revert functionality across multiple devices in accordance with one or more embodiments. System 100 includes one or more (×) computing devices 102 that can communicate with a server 104 via a network 106. Network 106 can be a variety of different networks, including the Internet, a local area network (LAN), a public telephone network, a cellular or other wireless phone network, an intranet, other public and/or proprietary networks, combinations thereof, and so forth.

Each computing device 102 can be a variety of different types of devices. For example, a computing device 102 can be a desktop computer, a mobile station, an entertainment appliance, a set-top box communicatively coupled to a display device, a cellular or other wireless phone, a personal digital assistant (PDA), a game console, an automotive computer, and so forth. Thus, each computing device 102 can range from a full resource device with substantial memory and processor resources (e.g., personal computers, game consoles) to a low-resource device with limited memory and/or processing resources (e.g., traditional set-top boxes, handheld game consoles). Different computing devices 102 can be the same type or alternatively different types of devices.

Server 104 can also be a variety of different types of computing devices. Similar to the discussion of computing device 102, server 104 can range from a full resource device with substantial memory and processor resources to a low-resource device with limited memory and/or processing resources. Although only one server 104 is illustrated system 100, alternatively multiple servers 104 can be included in system 100.

Each computing device 102 includes an image management module 112, a synchronization module 114, and optionally a storage device 116. Image management module 112 manages images stored by computing device 102, including the storage, retrieval, display, communication, and so forth of images. Images can be stored by computing device 102 locally, or alternatively on a remote storage device. Synchronization module 114 manages the synchronization of images across multiple computing devices 102. A user is able to request that images be synchronized among two more different devices 102, and synchronization module 114 supports this synchronization.

Each computing device 102 has a corresponding storage device 116. In one or more embodiments, storage device 116 is included as part of computing device 102 (e.g., an internal disk drive of computing device 102). An example of such a storage device is shown as storage device 116(1). Alternatively, this storage device can be coupled to computing device 102, such as via a bus (e.g., an IEEE 1394 bus, a universal serial bus (USB), a wireless universal serial bus (wireless USB), etc.), via a local network (e.g., a LAN), and so forth. An example of such a storage device is shown as storage device 116(x). For each device 102, images managed by module 112 and synchronized by module 114 are stored in storage device 116.

Server 104 includes an image synchronization module 122 and an image management service 124. Image synchronization module 122 can be implemented as part of image management service 124, or alternatively implemented independently. Image synchronization module 122 facilitates the synchronization of images among or across computing devices 102, as discussed in more detail below.

Image management service 124 facilitates management of images by computing devices 102. A user of a device 102 is able to access service 124, typically logging into service 124 with his or her credentials (e.g., a user identifier and optionally a password) or alternatively establishing the user's identity via another user authentication mechanism. It is to be appreciated that the user identifier is an identifier used by the user, but need not explicitly identify who the user is to other people. For example, the user identifier could be a series of letters, numbers, and/or other characters that is known to the user, but that is not known to other people as being used by the user.

Service 124 communicates with the various image management modules 112 of devices 102. When a user logs into service 124 from a particular device 102, service 124 communicates with the image management module 112 on that particular device 102 to identify that particular device 102. This identification of devices 102 allows service 124 to identify the various computing devices 102 that the user uses (e.g., the devices 102 from which the user logs into service 124), and thus to identify the different computing devices 102 across which images are to be synchronized.

The identifier of a device 102 can take a variety of different forms, such as an identifier (e.g., Media Access Control (MAC) address) assigned to a network card or adapter of device 102, a serial number or other identifier assigned to device 102, a hash value generated based on software programs installed on device 102, a name assigned to device 102 by a user of device 102, and so forth. This identifier is optionally communicated to service 124 only when the user gives module 122 permission to do so. This permission could be a global permission (e.g., by the user requesting that the identifier be sent each time the user logs into service 124), or alternatively an individual permission (e.g., the user can be prompted each time he or she logs into service 124 as to whether the identifier is to be communicated to service 124). Thus, the user is able to prevent an identification of device 102 from being sent to service 124 when the user desires to do so.

Image management service 124 maintains a record of the computing devices associated with the users logging into service 124. These devices 102 that the user is associated with are those devices 102 that the user uses to log into service 124. Each time a user logs into service 124, service 124 adds an identifier of the device 102 to this record. Optionally, the identifier is added only after the user has given his or her permission to add the identifier to the record. In one or more embodiments, when a user logs into service 124, service 124 checks whether the computing device 102 from which the user is accessing service 124 has previously been used by the user to access service 124. This check can be performed in different manners, such as by checking the record maintained by service 124 to determine whether the identifier of the device 102 from which the user is currently accessing service 124 is included therein.

If service 124 has not previously been used by the user from the device 102 from which the user is currently accessing service 124, then service 124 communicates with device 102 to display a user interface (UI) to the user asking the user whether he or she desires to have images on that device 102 synchronized with other devices 102 that are associated with the user. The user can request that the images on that device 102 be synchronized with other devices 102 that are associated with the user by responding affirmatively via the UI. Alternatively, the user can input a specific request (e.g., select an on-screen button, select an option from a pull-down menu, etc.) to have the device 102 that he or she is currently using synchronized with the other devices 102 that are associated with the user. If the user requests to have the images on that device 102 synchronized, service 124 adds an identifier of that device 102 added to a record of which devices 102 associated with a user are to be synchronized, as discussed in more detail below.

Image management module 112 allows a user of device 102 to make changes to an image. This functionality can be provided by module 112, or alternatively by one or more other components or modules that are invoked by or otherwise in communication with module 112. A variety of different changes can be made to an image, such as correcting red-eye in an image, changing a size or resolution of an image, changing a color or brightness of an image, applying different filters to alter the appearance of the image, and so forth.

For each image that is changed by a user, image management module 112 stores an original version of that image in a particular folder or folders of storage device 116. The original version of the image is an unchanged or unaltered version of the image. The folder or folders in which the originals versions are stored can also be referred to as an originals folder. Any changes made by the user are made to another version of the image that is stored at a location other than the originals folder, such as in an edited images folder.

In one or more embodiments, an original version of the image is stored in the originals folder when a user requests that a change be made to an image. Alternatively, the original version of the image can be stored in the originals folder at different times. For example, whenever a new image is obtained by computing device 102, image management module 112 can automatically save a copy of the new image in the originals folder and another copy of the image in an edited images folder.

Image management module 112 also supports a revert functionality that allows a user to revert to an original version of an image. Thus, if the user desires to discard any changes made to the image, he or she can input a revert request to invoke the revert functionality. In response to a revert request, module 112 replaces the edited version of the image with the original version stored in the originals folder. After replacing the edited version of the image, the original version of the image in the originals folder can be maintained in the originals folder or alternatively can be deleted from the originals folder. Additionally, the edited version of the image can be deleted or overwritten, or alternatively prior to being replaced the edited version can be stored (at least temporarily) in some other folder of storage device 116. Thus, with this revert functionality, the user is able to revert to the original version of the image when desired regardless of the changes made to an image by a user, thereby effectively un-doing any changes made in the edited version.

Additionally, in one or more embodiments, metadata associated with the different versions of the image can be merged. This merging can be accomplished in a variety of different manners, such as comparing timestamps associated with metadata to determine which is the most recent, replacing the metadata associated with the original version with the metadata associated with the edited version, and so forth. By merging metadata, any changes to the metadata (e.g., adding tags or keywords to the image) can be kept even though the user has reverted from the edited version of the image to the original version of the image.

Image management service 124 also maintains a record of which devices 102 associated with a user are to be synchronized. Synchronizing of the devices refers to the images and/or folders on the devices 102 being synchronized among the devices 102. Identifiers of the devices 102 that the user requests to have synchronized are added to this record, whereas other devices 102 associated with the user are not added to the record.

Image synchronization module 122, working in conjunction with synchronization modules 114, manages the synchronization of images across multiple computing devices 102. Any changes made by a user to an image on one of the devices 102 is automatically copied to the other device or devices of the synchronized devices 102. As the changes are copied among or across the various synchronized devices 102, the copies of the images stored by the various devices remain synchronized.

Figure 2:
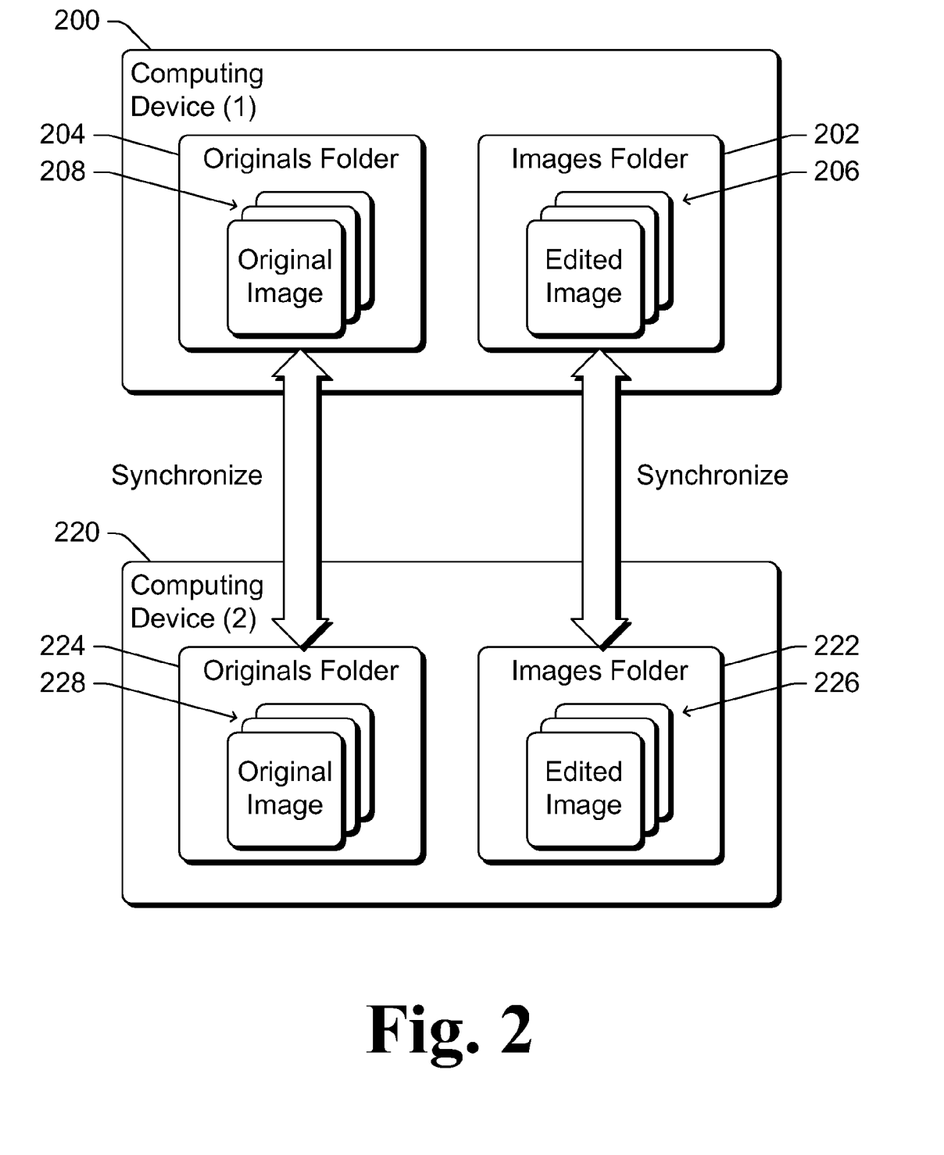
FIG. 2 illustrates an example of supporting media content revert functionality across multiple devices in accordance with one or more embodiments.

FIG. 2 illustrates an example of supporting media content revert functionality across multiple devices in accordance with one or more embodiments. Two computing devices 200 and 220 are illustrated in FIG. 2, each of which can be a computing device 102 of FIG. 1. Although only two computing devices 200 and 220 are illustrated in FIG. 2, it is to be appreciated that the synchronization discussed herein can be performed across three or more devices.

Computing device 200 stores on a storage device both an images folder 202 and an originals folder 204. Multiple edited versions of images 206 that can be (and/or already have been) edited are stored in images folder 202. Multiple original versions of images 208 are stored in originals folder 204. Similarly, computing device 220 stores on a storage device an images folder 222 storing multiple edited versions of images 226, and an originals folder 224 storing multiple original versions of images 228.

When images have been synchronized among or across computing devices 200 and 220, originals folders 204 and 224 maintain the same original versions of images, and images folders 202 and 222 maintain the same edited versions of images. Each time a change is made to a version of an image on one of devices 200 or 220, that change is copied to the other of devices 200 or 220. Similarly, each time a version of an image is added to a folder on one of devices 200 or 220, that change is copied to the other of devices 200 or 220.

In one or more embodiments, the synchronization process synchronizes one or more folders. Any changes to that folder are synchronized with the other devices. Examples of such changes include the addition of files (or other folders) to the folder, the removal of files (or other folders) to the folder, changes to a file in the folder, and so forth. Alternatively, the synchronization process can operate on a file basis rather than a folder basis, synchronizing individual files rather than entire folders.

The synchronization process can be implemented in a variety of different manners. In one or more embodiments, the synchronization of images across computing devices is facilitated by a remote service (e.g., image synchronization module 122 of server 104 of FIG. 1). Each time a change is made to a folder being synchronized (such as an image in the folder is changed, an image is added to the folder, an image is removed from the folder, etc.), an indication of that change is sent to the remote service, which in turn informs the other devices of the change. The specific change (e.g., the version of the image, the newly added image, an indication of the particular file removed, etc.) is communicated from the device on which the change was made to the other computing devices. The remote service typically maintains a record of which changes have been communicated to which computing devices. This record allows the remote service to communicate new changes to a particular computing device when that computing device becomes available (e.g., a logs into the remote service with that computing device, the computing device is powered-on and coupled to a network, and so forth). Alternatively, the specific change can be sent to the remote service and the remote service can be responsible for propagating the change to the other computing devices.

In other embodiments, the synchronization of images across computing devices is implemented without the assistance of such a remote service. In such embodiments, each time a change is made to a folder being synchronized, an indication of that change is sent by the computing device on which the change was made to the other computing devices. No remote service is used in such embodiments to facilitate the synchronization process. Rather, each computing device can maintain a record of which changes have been communicated to which computing devices.

In one or more embodiments, a security mechanism is used to allow the computing devices 102 among which the images are being synchronized to communicate the images to one another, but prevent other computing devices from being able to obtain usable copies of the images. A variety of different security mechanisms can be used. For example, each computing device among which the images are to be synchronized can be given an encryption key (e.g., by image synchronization module 122 or image management service 124), allowing the images to be encrypted and allowing only those computing devices that have the encryption key to decrypt the images. By way of another example, one or more digital certificates of the devices among which the images are to be synchronized can be used to ensure that images are encrypted only for those particular devices and/or to authenticate devices to one another. By way of yet another example, devices can be given individual device identifiers or other credentials (or alternatively the same identifier or credentials can be used for all devices among which the images are to be synchronized), and this identifier or credentials can be used to authenticate the devices to one another.

Returning to FIG. 1, in one or more embodiments, on each computing device 102 synchronization module 114 is informed of the various computing devices 102 across which the images are synchronized. This information can be obtained by module 114 from image synchronization module 122, or alternatively from other sources such as image management module 112. In other embodiments, synchronization module 114 need not be aware of the various computing devices 102 across which the images are synchronized. Rather, synchronization module 114 can rely on image synchronization module 122 to maintain the record of the various computing devices 102 across which the images are synchronized, and can rely on requests from the other devices for copies of images as part of the synchronization process.

Additionally, on each computing device 102 image management module 112 informs synchronization module 114 of which folder or folders on storage device 116 are to be synchronized among computing devices 102. Image management module 112 initiates creation of, or otherwise has knowledge of, which folder or folders on storage device 116 contain the original versions of images. This folder or folders could be a folder or folders that are stored at a default location with a default name in a directory hierarchy, can be created by module 112 (e.g., by invoking an Application Programming Interface (API) or otherwise invoking functionality of an operating system on device 102, etc.), and so forth. In one or more embodiments, the folder or folders on storage device 116 that contain the original versions of images is created by invoking the RegisterFolder method of the IKnownFolderManager COM (Component Object Model) interface implemented by the CLSID_KnownFolderManager COM server in the Microsoft Windows Vista® operating system. The ID for the originals folder when invoking this interface is FOLDERID_OriginalImages. Additional information regarding this interface is available from Microsoft Corporation of Redmond, Wash.

Image management module 112 also initiates creation of, or otherwise has knowledge of, which folder or folders on storage device 116 contain the edited versions of images. Similar to the originals folder, the edited images folder or folders could be a folder or folders that are stored at a default location with a default name in a directory hierarchy, can be created by module 112, and so forth.

Although the original folder or folder exists, in the supporting media content revert functionality across multiple devices discussed herein the users of devices 102 are typically shielded from knowledge that the original folder or folders exist. Rather, the users are informed of the revert functionality, but can be shielded from knowing how the revert functionality is implemented. Even if the users are aware of the existence of the original folder or folders, the users are typically shielded from knowing which folder or folders on storage devices 116 store the original versions of images.

When a user of device 102 requests that images from device 102 be synchronized with one or more other devices, image management module 112 automatically informs synchronization module 114 of the folder or folders in which the edited versions of the images are stored as well as the folder or folders in which the original versions of images are stored. Thus, in response to a user request to synchronize images across multiple computing devices, the folder or folders in which the original versions of images are stored is automatically selected as a folder to be synchronized, and identified to synchronization module 114. Synchronization module 114 can thus automatically synchronize the originals folder or folders, and thus automatically copy the original versions of images across the other devices 102 that are being synchronized. The user is thus relieved of any burden of knowing where the originals folder or folders is located, or even that an originals folder or folders storing original versions of images exists.

In one or more embodiments, synchronization module 114 is a module or component implemented by another application than implements image management module 112. For example, synchronization module 114 can be a module or component of an operating system or of a network service (e.g., as supplied by server 104 and/or image management service 124). In such embodiments, the functionality of synchronization module 114 is exposed and can be invoked by image management module 112 in order to inform synchronization module 114 of the folder or folders storing versions of images that are to be synchronized. This functionality can be exposed and invoked in different manners, such as via an API.

As both the edited and original versions of an image are synchronized among multiple devices 102, image changes and the revert functionality across the multiple devices 102 is supported. For example, if a change is made to an edited version of an image on one of devices 102, that change is propagated to the other devices 102 as part of the synchronization process. By way of another example, if a new original version of an image is added to a folder of one of devices 102, that new original version is propagated to the other devices 102 as part of the synchronization process. Accordingly, the revert functionality can be invoked by a user on any of the synchronized devices 102 regardless of on which of one or more of devices 102 changes to the image was made.

It is to be appreciated that situations can arise in which there are delays in propagating images to the devices 102 as part of the synchronization process. For example, one or more computing devices to which an image is to be sent may be powered down or otherwise unavailable. By way of another example, problems with network 106 may temporarily prevent or delay the sending of images among devices 102. These delays in propagating images to the devices 102 can result in a delay in making the revert functionality for a particular image available to a user.

In one or more embodiments, the revert functionality for a particular image is made available to the user of a particular device after the original version of that particular image has been saved in the originals folder of that particular device. Accordingly, if there is a delay in sending the original version of that particular image to that particular device, then there is a corresponding delay in making the revert functionality available to the user.

In the discussions herein, various references are made to the storage, editing, and synchronization of images. It is to be appreciated, however, that the same storage, editing, and synchronization functionality discussed herein with reference to images can also be applied to other types of media content, such as sequences or collections of images, videos, audio content, and so forth. Accordingly, the techniques discussed herein apply to a variety of different types of media content.

It should also be noted that the supporting media content revert functionality across multiple devices discussed herein maintains images, including edited and original versions of an image, on a per-user basis. Multiple different users can log into service 124 with the same computing device 102, yet still have separate folders for edited versions of images and original versions of images. It is also to be appreciated that multiple different users logging into service 124 using the same login credentials can share the same folders for edited versions of images and original versions of images. Alternatively, the supporting media content revert functionality across multiple devices discussed herein can maintain images on a per-device basis rather than a per-user basis. The synchronization can be performed in analogous manners as is done in the per-user basis, except that service 124 synchronizes images across devices regardless of the user that logs into service 124.

Figure 3:
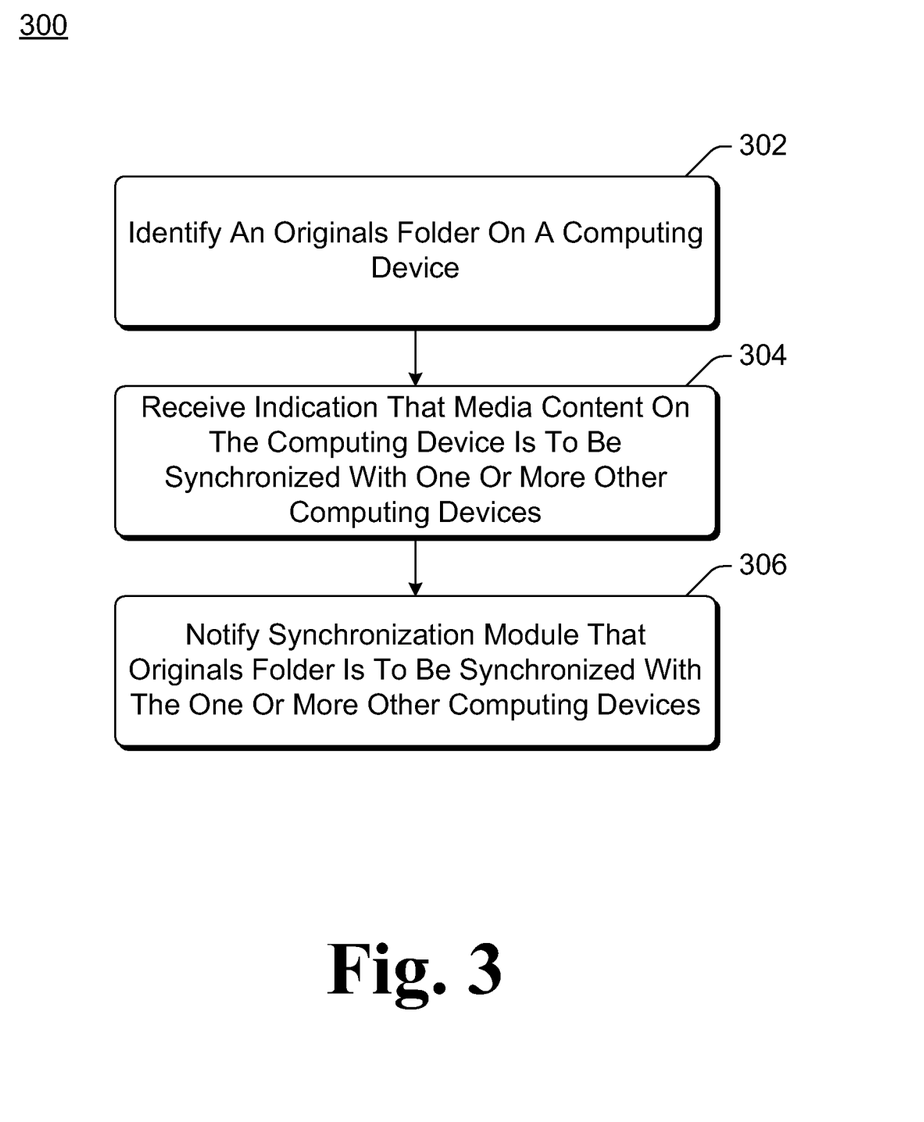
FIG. 3 is a flowchart illustrating an example process for supporting media content revert functionality across multiple devices in accordance with one or more embodiments.

FIG. 3 is a flowchart illustrating an example process 300 for supporting media content revert functionality across multiple devices in accordance with one or more embodiments. Process 300 is carried out by a device, such as a device 102 of FIG. 1, and can be implemented in software, firmware, hardware, or combinations thereof. Process 300 is an example process for supporting media content revert functionality across multiple devices; additional discussions of supporting media content revert functionality across multiple devices are included herein with reference to different figures.

In process 300, an originals folder on a computing device is identified (act 302). The originals folder stores original versions of images that have been and/or can be edited on the computing device implementing process 300. The originals folder can be identified in different manners, such as being a default folder, being a folder created by an image management module of the device implementing process 300, and so forth.

An indication that media content on the computing device is to be synchronized with one or more other computing devices is also received (act 304). This indication can take a variety of different forms, such as a request from a user of the device implementing process 300 to synchronize images on the device, a request from a remote image synchronization module (e.g., module 122 of FIG. 1) to synchronize images, and so forth.

In response to receiving the indication in act 304, a synchronization module is notified that the originals folder identified in act 302 is to be synchronized with the one or more other computing devices (act 306). These one or more other computing devices are the one or more other computing devices indicated in act 304. If not otherwise notified of the folder or folders storing the edited versions of images, the synchronization module can also be notified of such folders in act 306.

Figure 4:
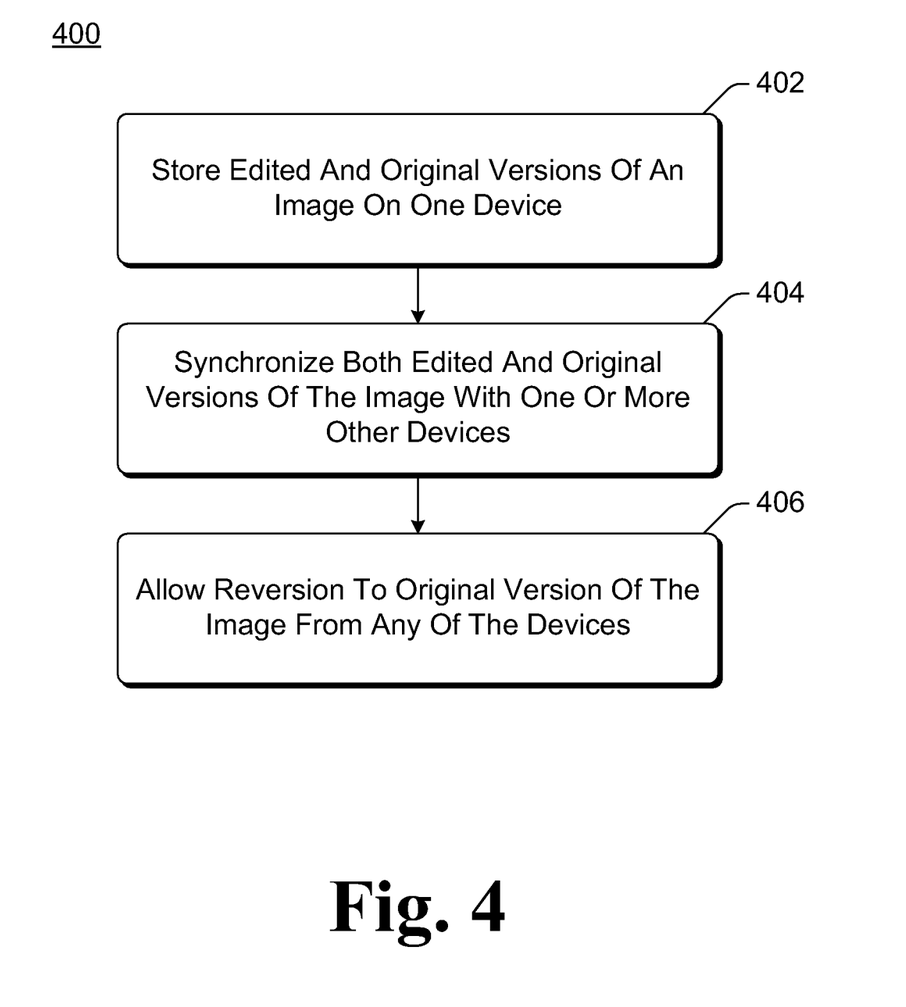
FIG. 4 is a flowchart illustrating another example process for supporting media content revert functionality across multiple devices in accordance with one or more embodiments.

FIG. 4 is a flowchart illustrating an example process 400 for supporting media content revert functionality across multiple devices in accordance with one or more embodiments. Process 400 is carried out by a device, such as a device 102 of FIG. 1, and can be implemented in software, firmware, hardware, or combinations thereof. Process 400 is an example process for supporting media content revert functionality across multiple devices; additional discussions of supporting media content revert functionality across multiple devices are included herein with reference to different figures.

In process 400, both edited and original versions of an image are stored on a device (act 402). These different versions can be stored in different folders, as discussed above.

Both the edited and the original versions of the image are synchronized with one or more other devices (act 404). This synchronization can be implemented in a variety of different manners as discussed above, including being folder-based or image-based as discussed above. Regardless of the manner in which the synchronization is implemented, changes to the synchronized images are propagated among the synchronized devices.

Reversion to the original version of the image is allowed from any of the devices (act 406). These devices in act 406 are the devices among or across which the image is synchronized. As discussed above, this reversion can be performed on any of the devices, regardless of the device or devices on which changes to the edited version of the image were made.

In the discussions above, references are made to synchronizing an originals folder and allowing a user to revert to an original version of an image. Although the above discussions primarily refer to a single originals folder, it is to be appreciated that multiple originals folders can be present on a computing device, and each of the multiple originals folders can be synchronized across multiple devices as discussed above.

Furthermore, it is to be appreciated that in addition to maintaining an original version of an image, multiple additional versions of an image can be maintained. These multiple additional versions are stored as the image is being edited by the user, each reflecting the state of the image at different points of the editing process. The determination of when such an additional version is generated can vary, such as whenever a user presses a "save" button, daily, after the image has been opened by an image editing application for a threshold amount of time, and so forth. The user can input a request to the computing device whenever he or she desires to revert to one of these additional versions. The user can identify the particular additional version desired, and have that identified version replace the current edited image analogous to reverting to an original version of the image as discussed above.

These multiple additional versions can be stored in different manners. In one or more embodiments, the additional versions are stored in one or more additional version folders. The synchronization modules can also be notified of each of these backup version folders, allowing each of these backup version folders to be synchronized across multiple devices analogous to the discussion above regarding the originals folder and original versions of the images. Alternatively, the additional versions can be stored in a folder already being synchronized (e.g., a folder containing edited versions of images, a folder containing original versions of images, and so forth). These additional versions can be stored using a filename that identifies them as being additional versions, such as by adding "revision 1", "revision 2", "revision 3", etc. to the filenames of the images. These additional versions can also be identified in other manners, such as by having a separate record mapping images to revisions, having other metadata corresponding to the images identify the additional versions, and so forth.

Figure 5:
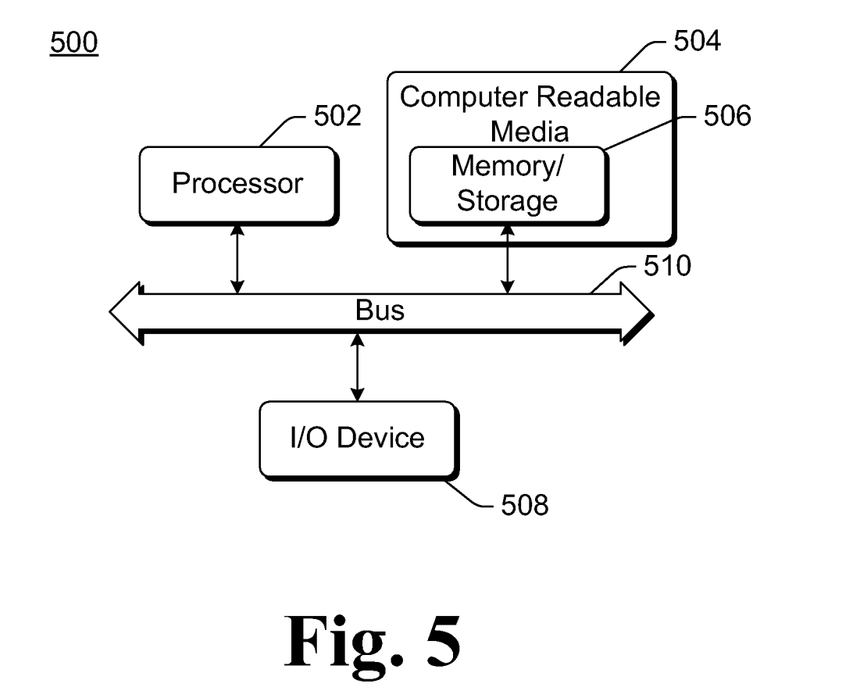
FIG. 5 illustrates an example computing device that can be configured to implement the supporting media content revert functionality across multiple devices in accordance with one or more embodiments.

FIG. 5 illustrates an example computing device 500 that can be configured to implement the supporting media content revert functionality across multiple devices in accordance with one or more embodiments. Computing device 500 can be, for example, any of computing devices 102 of FIG. 1, server 104 of FIG. 1, a computing device 200 or 220 of FIG. 2, and so forth.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more IPO devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module," "component," and "functionality" as used herein generally represent software, firmware, hardware, or combinations thereof. In the case of a software implementation, the module, component, or functionality represents program code that performs specified tasks when executed on a processor (e.g., CPU or CPUs). The program code can be stored in one or more computer readable media, further description of which may be found with reference to FIG. 5. The features of the supporting media content revert functionality across multiple devices techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a first computing device, the method comprising:
   storing both an edited version of a first image and an original version of the first image;
   synchronizing, by exchanging whole image files, in response to a user request to synchronize images across multiple computing devices with which a user is associated including the first computing device and a second computing device, both the edited version of the first image and the original version of the first image with the second computing device, a user request to synchronize images on the second computing device with images on the first computing device having been previously made;
   allowing, in response to a user request to revert to the original version of the first image, reversion to the original version of the first image regardless of on which of the multiple computing devices the edited version was changed;
   obtaining an original version of a second image from the second computing device;
   allowing, in response to a user request to revert to the original version of the second image, reversion to the original version of the second image after the second image has been edited at one or more of the multiple computing devices;
   receiving an indication from a remote service, the remote service not storing any images, that the original version of the second image has been added to an originals folder of the second computing device; and
   wherein the obtaining comprises obtaining the original version of the second image in response to the indication.

2. A method as recited in claim 1, further comprising:
   receiving, from the second computing device, a new edited version of the first image;
   replacing the edited version of the first image with the new edited version of the first image; and
   allowing, in response to the user request to revert received at the first computing device, reversion to the original version of the first image.

3. A method as recited in claim 1, wherein the storing comprises storing the original version of the first image in response to receiving, at the first computing device, a request to alter the first image.

4. A method as recited in claim 1, further comprising:
   identifying a first folder of the first computing device that stores the original version of the first image; and
   notifying a synchronization module of the first computing device that the first folder is to be synchronized with a second folder on the second computing device.

5. A method as recited in claim 4, further comprising communicating the original version of the first image to the second computing device for storage in the second folder.

6. A method as recited in claim 4, further comprising communicating the original version of the first image to a remote service for storage of the first image on the multiple computing devices.

7. A method as recited in claim 1, further comprising:
   obtaining an original version of a second image from a remote service; and
   allowing, in response to a user request to revert to the original version of the second image, reversion to the original version of the second image after the second image has been edited at one or more of the multiple computing devices.

8. A method as recited in claim 1, further comprising:
maintaining one or more additional versions of the first image in one or more additional folders; and
allowing, in response to a user input identifying one of the one or more additional versions of the first image, reversion to the identified one of the one or more additional versions.

9. A method as recited in claim 1, further comprising invoking an application programming interface (API) of an operating system of the first computing device to create an originals folder in which the original version of the first image is stored.

10. One or more computer storage memories having stored thereon multiple instructions that, when executed by one or more processors of a first computing device, cause the one or more processors to:
identify a first folder of the first computing device, the first folder storing an original version of first media content having an edited version that is stored in a second folder of the first computing device, the first media content being one of multiple media content on the first computing device;
receive an indication that the multiple media content on the first computing device are to be synchronized with a second computing device, a user being associated with both the first computing device and the second computing device due to a user login to a content management service having been performed from both the first computing device and the second computing device;
notify, in response to receiving the indication, a synchronization module of the first computing device that the first folder is to be synchronized with a third folder of the second computing device by exchanging whole image files;
obtain an original version of second media content from the second computing device;
allow, in response to a user request to revert to the original version of the second media content, reversion to the original version of the second media content after the second media content has been edited at one or both of the first computing device and the second computing device;
receive an indication from a remote service, the remote service not storing any images, that the original version of the second media content has been added to an originals folder of the second computing device; and
wherein to obtain the original version is to obtain the original version of the second media content in response to the indication.

11. One or more computer storage memories as recited in claim 10, wherein each of the multiple media content comprises a different image.

12. One or more computer storage memories as recited in claim 10, wherein the instructions further cause the one or more processors to allow, in response to a user request to revert to the original version of the first media content, reversion from the edited version of the first media content to the original version of the first media content regardless of on which of the computing devices the first media content may have been changed.

13. One or more computer storage memories as recited in claim 10, wherein the instructions further cause the one or more processors to invoke an application programming interface (API) of an operating system of the first computing device to create the first folder.

14. One or more computer storage memories as recited in claim 10, wherein the instructions further cause the one or more processors to:
maintain one or more additional versions of the first media content; and
allow, in response to a user input identifying one of the one or more additional versions of the first media content, reversion to the identified one of the one or more additional versions.

15. A method implemented in a first computing device, the method comprising:
identifying a first folder of the first computing device, the first folder storing an original version of a first image having an edited version that is stored in a second folder of the first computing device, the first image being one of multiple images on the first computing device;
receiving an indication that the multiple images on the first computing device are to be synchronized with a second computing device, a user being associated with both the first computing device and the second computing device, and a user request to synchronize images on the second computing device with images on the first computing device having been previously made;
notifying, in response to receiving the indication, a synchronization module of the first computing device that the first folder is to be synchronized with a third folder of the second computing device;
synchronizing the first folder of the first computing device with the third folder of the second computing device, and synchronizing the second folder of the first computing device with a fourth folder of the second computing device by exchanging whole image files; and
reverting, in response to a user request to revert to the original version of the first image, from the edited version of the first image to the original version of the first image regardless of whether the edited version of the first image was edited on the second computing device;
obtaining an original version of a second image from the second computing device;
allowing, in response to a user request to revert to the original version of the second image, reversion to the original version of the second image after the second image has been edited at one or more of the multiple computing devices;
receiving an indication from a remote service, the remote service not storing any images, that the original version of the second image has been added to an originals folder of the second computing device; and
wherein the obtaining comprises obtaining the original version of the second image in response to the indication.

16. A method as recited in claim 15, further comprising:
maintaining one or more additional versions of the first image in one or more additional folders of the first computing device; and
reverting, in response to a user request identifying one of the one or more additional versions of the first image, to the identified one of the one or more additional versions.

* * * * *